US009642042B2

(12) United States Patent
Lisak

(10) Patent No.: US 9,642,042 B2
(45) Date of Patent: May 2, 2017

(54) CALL CONTINUITY WHEN MOVING FROM ONE COMMUNICATION SESSION TO ANOTHER COMMUNICATION SESSION

(71) Applicant: BlackBerry Limited, Waterloo (CA)

(72) Inventor: Darko Joseph Lisak, Ottawa (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/919,485

(22) Filed: Jun. 17, 2013

(65) Prior Publication Data

US 2014/0370886 A1    Dec. 18, 2014

(51) Int. Cl.
*H04W 36/00*    (2009.01)
*H04W 76/06*    (2009.01)

(52) U.S. Cl.
CPC .... *H04W 36/0022* (2013.01); *H04W 36/0011* (2013.01); *H04W 76/06* (2013.01)

(58) Field of Classification Search
CPC ............ H04W 36/00; H04W 36/0011; H04W 36/0055; H04W 36/0022; H04W 36/14; H04W 88/06; H04W 36/0066; H04W 36/08; H04W 76/06
USPC ........................... 455/436–444; 370/331–334
See application file for complete search history.

(56) References Cited

U.S. PATENT DOCUMENTS

2005/0090259 A1*  4/2005  Jain et al. .................... 455/439
2008/0280611 A1* 11/2008  Miklos et al. ................ 455/436
2009/0163240 A1*  6/2009  Ryu ................. H04M 1/72522
                                                    455/553.1
2009/0279503 A1* 11/2009  Chin et al. ................... 370/331
2010/0329210 A1* 12/2010  Shirota et al. ............... 370/331
2010/0330993 A1* 12/2010  Kone .............. H04W 36/0055
                                                    455/436
2011/0009121 A1*  1/2011  Yu ...................... H04W 68/12
                                                    455/439
2011/0230162 A1    9/2011  Mutikainen et al.
(Continued)

FOREIGN PATENT DOCUMENTS

EP    2229036 A1    9/2010
EP    2393324 A2   12/2011
(Continued)

OTHER PUBLICATIONS

Shwetha Vittal, "Single Radio Voice Call Continuity (SRVCC) with LTE", Radisys White Paper, Sep. 2011, pp. 1-10, Hillsboro, OR, USA.
(Continued)

*Primary Examiner* — Thai Vu
(74) *Attorney, Agent, or Firm* — Borden Ladner Gervais LLP; Todd Keeler

(57) ABSTRACT

In some embodiments, there are disclosed systems and methods in which, when a mobile device receives a message indicating that the mobile device is to release resources pertaining to a communication session for a voice call over an access network, the mobile device refrains from performing this action to allow for the possible arrival and processing of a delayed handover command. The arrival of the handover command causes the mobile device to handover to a second access network to continue the voice call using a second communication session. This may help address situations in which the handover command is delayed in the network and is therefore delayed in reaching the mobile device.

17 Claims, 8 Drawing Sheets

(56) References Cited

U.S. PATENT DOCUMENTS

| | | | |
|---|---|---|---|
| 2011/0268098 | A1 | 11/2011 | Keller et al. |
| 2012/0014355 | A1 | 1/2012 | Jung et al. |
| 2012/0014356 | A1 | 1/2012 | Mutikainen et al. |
| 2012/0076114 | A1* | 3/2012 | Oguchi .................. 370/336 |
| 2012/0172042 | A1* | 7/2012 | Drevon et al. ............ 455/436 |

FOREIGN PATENT DOCUMENTS

| | | |
|---|---|---|
| EP | 2393324 A3 | 3/2012 |
| WO | 2007042122 A1 | 4/2007 |
| WO | 2011139045 A2 | 11/2011 |

OTHER PUBLICATIONS

"3rd Generation Partnership Project; Technical Specification Group Core Network and Terminals; IP Multimedia (IM) Core Network (CN) subsystem IP Multimedia Subsystem (IMS) Service Continuity; Stage 3 (Release 11)", 3GPP TS 24.237 V11.6.0 (Mar. 2013), Technical Specification, pp. 191-198, Valbonne, France.

"3rd Generation Partnership Project; Technical Specification Group Services and System Aspects; IP Multimedia Subsystem (IMS); Stage 2 (Release 11)", 3GPP TS 23.228 V11.7.0 (Dec. 2012), Technical Specification, pp. 142-145, Valbonne, France.

"3rd Generation Partnership Project; Technical Specification Group Services and System Aspects; IP Multimedia Subsystem (IMS) Service Continuity; Stage 2 (Release 11)" 3GPP TS 23.237 V11.7.0 (Mar. 2013), Technical Specification, pp. 34-84, Valbonne, France.

"Digital cellular telecommunications system (Phase 2+); Universal Mobile Telecommunications System (UMTS); LTE; Single Radio Voice Call Continuity (SRVCC); Stage 2 (3GPP TS 23.216 version 11.8.0 Release 11)", ETSI TS 123 216 V11.8.0(Apr. 2013), Technical Specification, pp. 1-68, Cedex, France.

Extended European Search Report for European Patent Application No. 13172211.8, dated Nov. 25, 2013, 6 pages.

"3rd Generation Partnership Project; Technical Specification Group Services and System Aspects; Single Radio Voice Call Continuity (SRVCC); Stage 2 (Release 11)", 3GPP TS 23.216 V11.8.0, Mar. 2013, Sophia Antipolis, Valbonne France, 67 pages.

Liang Ji, International Search Report and Written Opinion for related international application PCT/CA2014/050521, dated Jul. 30, 2014, 8 pages total.

"3rd Generation Partnership Project; Technical Specification Group Services and System Aspects; Single Radio Voice Call Continuity (SRVCC); Stage 2 (Release 11)", 3GPP TS 23.216 V11.8.0 (Mar. 2013), Sophia Antipolis, Valbonne France, 67 pages.

\* cited by examiner

CALL CONTINUITY WHEN MOVING FROM ONE COMMUNICATION SESSION TO ANOTHER COMMUNICATION SESSION

FIELD

The following relates to moving a voice call from one communication session to another communication session, such as from a packet switched session to a circuit switched session, or vice versa.

BACKGROUND

A circuit switched path is created when two devices or entities in a network establish a dedicated communications path that allows the two entities to communicate directly with each other. This dedicated and reserved communications path is typically established before the two entities start communicating. Early analog telephone systems use such circuit switching. Traditional methods of voice calling via mobile networks also use circuit switching. Circuit switching is still used in some networks for voice calls, particularly in legacy networks.

Packet switching is different from circuit switching and occurs when two devices or entities in a network do not establish a dedicated communications path in advance, but instead the data to be communicated from one entity to the other is partitioned into packets, and each packet is forwarded from the sender to the receiver, perhaps travelling along a different path in the network compared to the other packets. The network architecture of the Evolved Packet System (EPS) has been designed to support packet switching only, not circuit switching.

It may be the case that a call is initiated and set up in a packet switched (PS) domain, such that the call is ongoing in a PS session. Then, during the call, it is desired to transfer the call to a circuit switched (CS) session in the CS domain. Please consider the following example. Assume the call is initiated in the EPS and is anchored in the IP Multimedia Subsystem (IMS). The call is therefore initially ongoing in a PS session in the PS domain. Then, while the call is ongoing, conditions of the EPS network deteriorate (e.g. the mobile device begins moving out of the range of all evolved Node Bs in the EPS network). However, it is determined on the network side that a CS connection can be established and offered through a neighbouring Node B (e.g. via a Universal Terrestrial Radio Access Network or a GSM EDGE Radio Access Network). The circuit is set up and the mobile device is handed over to neighbouring Node B, and the call continues, but in a CS session in the CS domain.

When moving an ongoing call from a PS session to a CS session, such as in the scenario above, it is desired to reduce or avoid disruption of the call. More generally, when moving a voice call from one communication session to another communication session (e.g. from one PS session to another PS session, or from a PS session to a CS session, or from a CS session to a PS session, or from one CS session to another CS session), it is desired to reduce or avoid disruption of the call.

BRIEF DESCRIPTION

Embodiments of the present application will be described, by way of example only, with reference to the accompanying figures wherein.

Like reference numerals are used in different figures to denote similar elements.

DETAILED DESCRIPTION

Figure 1:
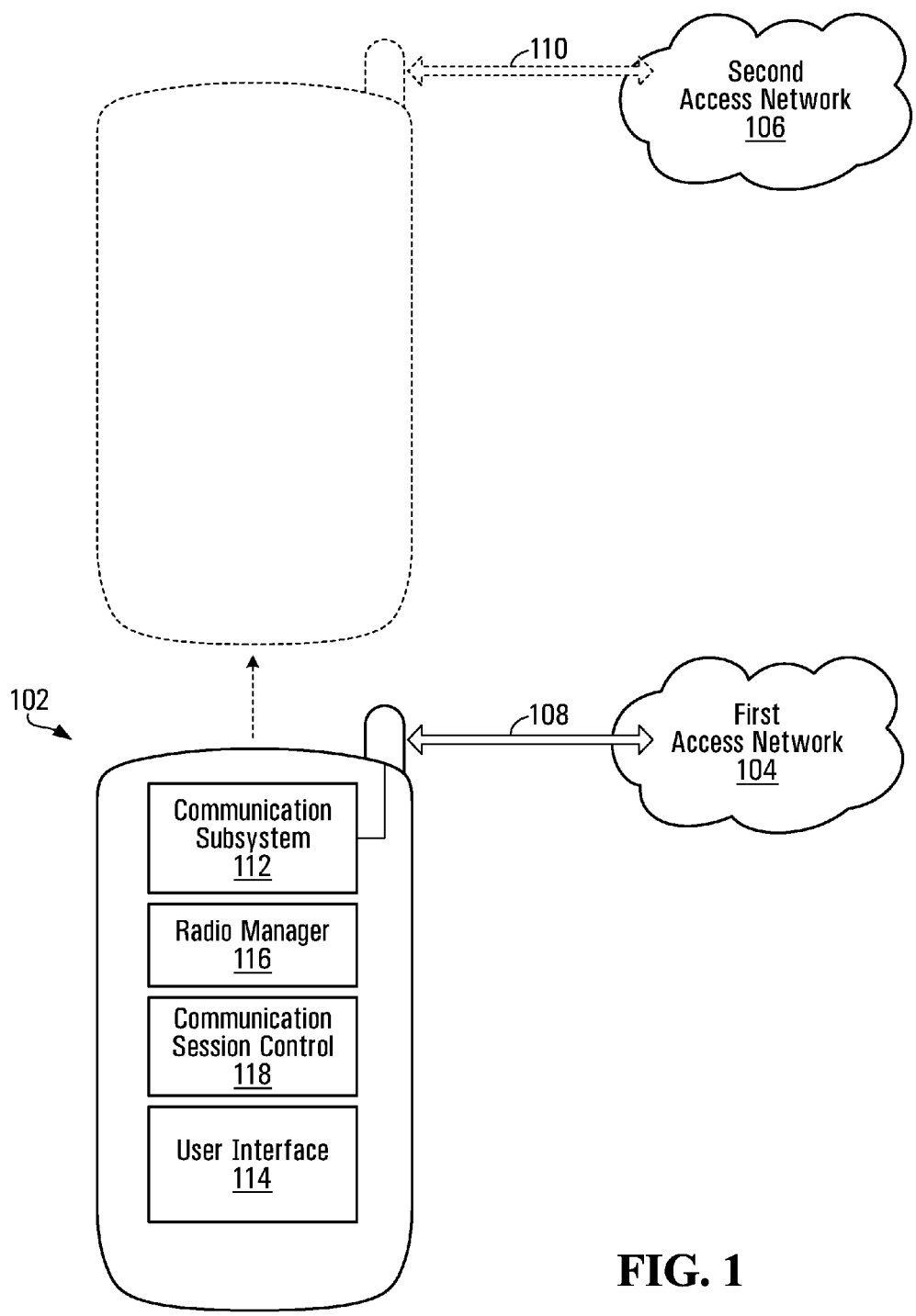
FIG. 1 is a block diagram of a mobile device handing over from a first access network to a second access network.

In one aspect, there is provided a method comprising: receiving a message at a mobile device, the message indicating that the mobile device is to release resources pertaining to a first communication session for a voice call over a first access network; if a handover command has not been received by the mobile device, then the mobile device refraining from releasing the resources pertaining to the first communication session and waiting for arrival of the handover command, for up to a predetermined amount of time.

The method may optionally further comprise: if the handover command is received during said refraining, then the mobile device handing over to a second access network and continuing the voice call using a second communication session.

The method may optionally further comprise: if the handover command is not received during said refraining, then the mobile device releasing the resources pertaining to the first communication session upon expiry of the predetermined amount of time and indicating that the voice call has been terminated.

The handing over to the second access network may optionally further comprise releasing the resources pertaining to the first communication session.

The first communication session may optionally be a packet switched (PS) session, and the second communication session may optionally be a circuit switched (CS) session.

Refraining up to the predetermined amount of time may optionally further comprise starting a timer upon receipt of the message and waiting up to expiry of the timer.

The timer may optionally be configured to expire 2000 ms after it is started.

The method may optionally be performed along with or as part of a Single Radio Voice Call Continuity (SRVCC) protocol.

Releasing the resources pertaining to the first communication session may optionally further comprise one or more of: the mobile device releasing its codec for the voice bearer, the mobile device releasing data resources it was using for the first communication session, and the mobile device releasing resources it was using to maintain call control for the first communication session.

Releasing the resources pertaining to a first communication may optionally comprise relinquishing the resources pertaining to the communication session, as specified in the 3GPP document TS 24.237 V11.6.0 "Technical Specification Group Core Network and Terminals; IP Multimedia (IM) Core Network (CN) subsystem IP Multimedia Subsystem (IMS) Service Continuity; Stage 3 (Release 11)".

The message may optionally be one of the following: SIP BYE, "hang up", or DISCONNECT.

The method may optionally further comprise receiving the message while the voice call is ongoing.

The method may optionally further comprise: if coverage is lost such that the mobile device is unable to communicate with the first access network while said refraining, then the mobile device releasing its resources pertaining to the first communication session.

The method may optionally further comprise: repeating the method such that it is performed anew each time a message is received at the mobile device indicating that the mobile device is to release resources pertaining to a communication session for a voice call over an access network.

The second access network may optionally be a network that does not support a PS voice bearer.

The first access network may optionally be part of the Evolved Packet System (EPS), and the second access network may optionally not be part of the EPS.

At least one of the first and second access networks may optionally be a 3GPP access network.

The first access network may optionally be a CS network, and the second access network may optionally be a PS network.

In another aspect, there is provided an apparatus configured to perform any of the methods disclosed above and herein.

The apparatus may optionally be a mobile device. Optionally, the mobile device may further include one or more processors that perform the methods.

The mobile device may optionally further comprise one or more communication subsystems for communicating with a plurality of access networks.

The mobile device may optionally further comprise a user interface.

In another aspect, there is provided a mobile device comprising: one or more communication subsystems for communicating with a plurality of access networks; a communication session control module for receiving a message, the message indicating that the mobile device is to release resources pertaining to a first communication session for a voice call over a first access network; wherein upon receipt of the message, the mobile device is for performing operations comprising: if a handover command has not been received by the mobile device, then the mobile device refraining from releasing the resources pertaining to the first communication session and waiting for arrival of the handover command, for up to a predetermined amount of time.

The mobile device may optionally be for performing operations further comprising: if the handover command is received during said refraining, then the mobile device handing over to a second access network and continuing the voice call using a second communication session.

The mobile device may optionally further comprise a user interface, and the mobile device may optionally be for performing operations further comprising: if the handover command is not received during said refraining, then the mobile device releasing the resources pertaining to the first communication session upon expiry of the predetermined amount of time and indicating at the user interface that the voice call has been terminated.

The mobile device may optionally further comprise a timer, and said refraining up to the predetermined amount of time may optionally comprise the mobile device starting its timer upon receipt of the message and waiting up to expiry of the timer.

The mobile device may optionally be for performing any of the other methods described herein.

In another aspect, there is provided a computer readable storage medium having stored thereon computer executable instructions that, when executed, cause a mobile device to perform operations comprising: receiving a message at the mobile device, the message indicating that the mobile device is to release resources pertaining to a first communication session for a voice call over a first access network; if a handover command has not been received by the mobile device, then the mobile device refraining from releasing the resources pertaining to the first communication session and waiting for arrival of the handover command, for up to a predetermined amount of time.

The computer executable instructions, when executed, may optionally cause the mobile device to perform any of the additional steps in the methods described above and herein.

For illustrative purposes, some specific example embodiments will now be explained in greater detail below in conjunction with the figures.

The embodiments set forth herein represent the necessary information to practice the claimed subject matter and illustrate the best way of practicing such subject matter. Upon reading the following description in light of the accompanying figures, those of sufficient skill will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to a computer/processor readable storage medium or media for storage of information, such as computer/processor readable instructions, data structures, program modules, or other data. A non-exhaustive list of examples of computer/processor readable storage media include magnetic cassettes, magnetic tape, magnetic disk storage or other magnetic storage devices, optical disks such as CD-ROM, DVDs, Blu-ray, or other optical storage, volatile and non-volatile, removable and non-removable media implemented in any method or technology, RAM, ROM, EEPROM, flash memory or other memory technology. Any such computer/processor storage media may be part of a device or accessible or connectable thereto. Any application or module herein described may be implemented using computer/processor readable/executable instructions that may be stored or otherwise held by such computer/processor readable storage media.

In general, there are disclosed systems and methods in which, when a mobile device receives a message indicating that the mobile device is to release resources pertaining to a communication session for a voice call over an access network, the mobile device refrains from substantially acting upon the message to allow for possible arrival and processing of a handover command. The handover command, if received, causes the mobile device to hand over to a second access network to continue the voice call in a second communication session. This may help address situations in which the handover command is delayed in the network. In particular, if the message indicating that the mobile device is to release resources pertaining to the first communication session is substantially acted upon before arrival of the handover command, it will typically be too late to hand over to the second access network to continue the call, and the call will be dropped instead of handed over. The methods and systems disclosed below may be useful in situations such as packet-switched (PS) to circuit-switched (CS) fallback, but more generally they may apply to any situation in which a voice call is being moved from one communication session to another communication session (e.g. from one PS session to another PS session, or from a PS session to a CS session, or from a CS session to a PS session, or from one CS session to another CS session).

Turning now to FIG. 1, there is illustrated a mobile device 102 attached to a first access network 104. A communication session for a voice call is established over the first access network 104. This will be referred to as the "first communication session", and it is shown (generally) using thick black arrow 108.

During the voice call, a decision is made to hand over to a second access network 106 to continue the call over a second communication session established in the second access network 106. The second communication session is shown (generally) using a stippled black arrow 110. As one example, it may be decided by the first access network 104 that handover is required because the first access network 104 recognizes that the mobile device 102 is moving out of the coverage of the first access network 104, but is within (or moving into) the coverage of the second access network 106.

As part of the handover process on the network side, the second communication session is set up on the network side of the second access network 106, and a handover command is sent to the mobile device 102 to handover to the second access network 106 to continue the call on the second communication session. In general, the handover command may be sent over the first access network 104 or the second access network 106, but typically it will be sent over the first access network 104. The first access network 104 also releases the first communication session on its side, and as part of this process sends a message to the mobile device 102, which indicates that the mobile device 102 is to release its resources pertaining to the first communication session. This message may be, for example, a SIP BYE message, or a disconnect message, or the like, depending upon the specific implementation, and depending upon whether the first communication session is a PS session or a CS session.

Ideally, the handover command is received first, and in response the mobile device 102 hands over to the second access network 106 to continue the call in the second communication session. As part of the handover process, the mobile device 102 releases its resources relating to the first communication session, as it is now communicating over the second communication session. When the message is subsequently received at the mobile device 102, the message indicating that the mobile device is to release its resources pertaining to the first communication session, this message is effectively ignored by the mobile device 102, since the relevant processes relating to releasing the first communication session have been completed on the mobile device side (as part of the handover), and since the other processes relating to this message (such as informing the higher layers and the user that the call has been terminated), are not applicable because the call has not ended, but has instead been handed over to the second access network.

However, due to network delays it may be the case that the message from the first access network 104 that indicates that the mobile device 102 is to release its resources pertaining to the first communication session is received before the handover command. In such a situation, the mobile device 102 may not know whether it is being handed over to another access network (i.e. the second access network 106 in FIG. 1) to continue the call in another communication session, or whether the message is being received for another reason (e.g. because the other party hung up and ended the call). In any case, acting on the message would cause the mobile device 102 to release its resources pertaining to the first communication session and, as per this message, cause the mobile device 102 to ultimately terminate the call at the mobile device side and inform the user of the call termination. For example, the mobile device 102 would typically release its codec for the voice bearer of the first communication session, release the data resources it was using for the first communication session, and release the resources it was using to maintain call control for the first communication session. The user would be informed that the call has been terminated. If it happened to be the case that the intent was for the call to be handed over to the second access network 106 to continue the call in a second access network 106, but that the handover had not occurred yet because the handover command was delayed reaching the mobile device 102, then the call may be dropped without handing over. Even if the handover command arrived shortly after the message, it would typically be too late and the handover command would typically be ignored by the mobile device. This is because, once the message starts to be processed, the mobile device is typically not configured to try to reverse the processing and act on the handover command instead.

To help address the potential drawback described above, the method of FIG. 2 is performed.

In step 202, a message is received at a mobile device 102. The message indicates that the mobile device 102 is to release resources pertaining to a first communication session for a voice call over the first access network 104.

In step 204, if a handover command has not been received by the mobile device 102, then the mobile device 102 refrains from releasing the resources pertaining to the first communication session and waits for arrival of the handover command. This refraining and waiting is performed for up to a predetermined amount of time.

Two additional steps may be as follows:

(i) if the handover command is received during said refraining, then the mobile device 102 hands over to the second access network 106 and continues the voice call using a second communication session.

(ii) if the handover command is not received during said refraining, then the mobile device 102 releases the resources pertaining to the first communication session upon expiry of a predetermined amount of time and indicates that the voice call has been terminated.

Figure 2:
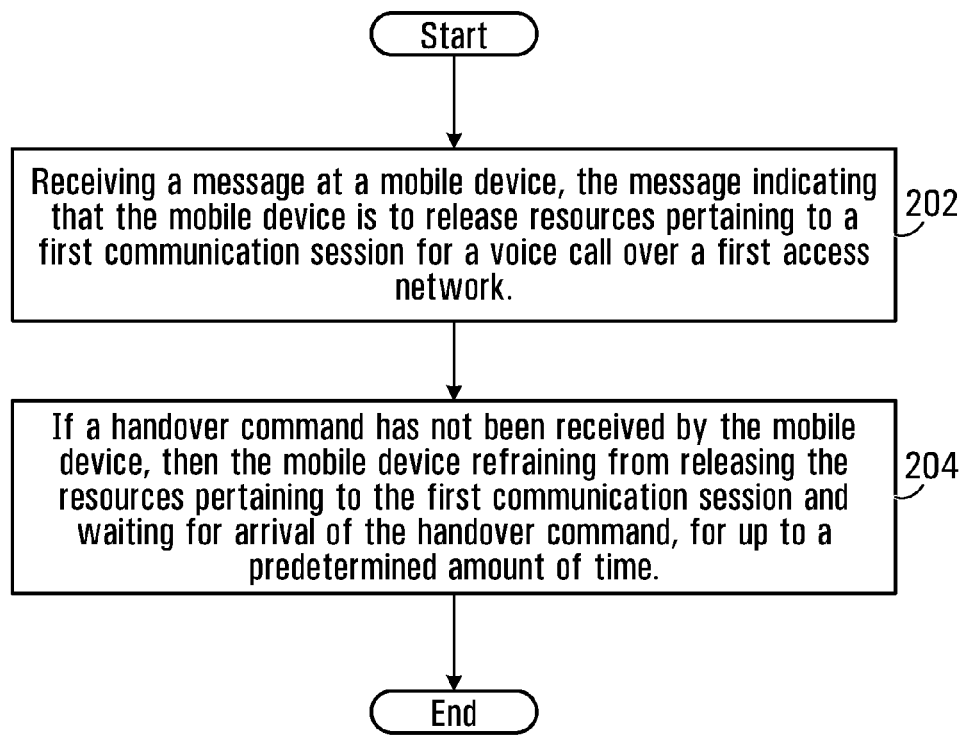
FIG. 2 is a flow diagram illustrating a method performed by a mobile device.

It will be appreciated that steps (i) and (ii) may be interchanged. Also, these steps can be considered optional, since the heart of the method of FIG. 2 is in step 204. That is, the heart of the method is the step of waiting (up to a predetermined amount of time) after the message is received to allow for arrival and processing of the delayed handover command, before releasing the resources pertaining to the first communication session, as per the message received in step 202.

A message that indicates that the mobile device 102 is to release resources pertaining to a first communication session for a voice call over the first access network 104, as mentioned in the method above, does not mean that the message literally has to say or instruct "release resources pertaining to a first communication session for a voice call over the first access network", although it may literally say or instruct this. Instead, any message that a mobile device receives and acts upon that results in or would result in the mobile device releasing its resources pertaining to the first communication session can be considered a message indicating that the mobile device is to release resources pertaining to the first communication session. Examples of such messages include: SIP BYE, "hang up", and "disconnect".

One application of the method described above is in PS to CS fallback scenarios, such as those described in the 3GPP document ETSI TS 23.216 v.11.8.0 "Digital cellular telecommunications system (Phase 2+); Universal Mobile Telecommunications System (UMTS); LTE; Single Radio Voice Call Continuity (SRVCC); Stage 2", released in April 2013, publically available, and incorporated herein by reference. In such a fallback scenario, the "first communication session" can be considered to be the PS session in which the call is initiated and ongoing. The "second communication session" is the CS session in which the call continues when handover to the second access network occurs. The "hang up" or "SIP BYE" message is the message indicating that the mobile device is to release resources pertaining to the first communication session (which is the PS session in this example). It may be the case that the SIP BYE is sometimes received at the mobile device before the handover command. The method of FIG. 2 may help prevent or reduce the number of times a call is dropped due to the handover command being delayed in the network and received at the mobile device after the SIP BYE. FIGS. 3 to 8 describe in detail an example implementation as applied to a PS to CS fallback situation.

The methods described herein are not limited to PS to CS fallback scenarios, but have potential application in any protocol in which a call is being handed over to another access network to continue in another communication session over that other access network. In such protocols, depending upon the implementation, it may be the case that sometimes the message from the first access network that indicates that the mobile device is to release its resources pertaining to the first communication session is received before the handover command. The methods described herein (e.g. in relation to FIG. 2) may help address such a situation. Such a situation may arise, for example, in voice call continuity from PS to CS (as described in relation to FIGS. 3 to 8) or in voice call continuity from CS to PS (such as in Section 6.4 of the 3GPP TS 23.216 v.11.8.0 document mentioned above). More generally, such a situation may also arise in some implementations when moving a call from one PS session to another PS session, or from one CS session to another CS session.

The mobile device 102 of FIG. 1 is illustrated as having at least one communication subsystem 112 for communicating with the access networks 104 and 106, a user interface 114, a radio manager 116 for processing the handover command and controlling the hand over from the first access network 104 to the second access network 106, and a communication session control module 118 for receiving the message indicating that the mobile device 102 is to release its resources pertaining to the first communication session. The mobile device 102 also includes other components and modules, that are not illustrated for ease of illustration, such as an operating system and a means for keeping track of the predetermined amount of time the mobile 102 is to wait after the message is received indicating that the mobile device 102 is to release its resources pertaining to the first communication session. The means for waiting (i.e. refraining) may be a timer that is started upon receipt of the message and that expires after a predetermined amount of time has elapsed, or it may be some other means (such as an event, or series of events, such as events originating from another register or state in the mobile device 102). It will be appreciated that the operations performed by the mobile device 102 in FIG. 2 are controlled by instructions stored on a computer readable storage medium and executed by one or more processors of the mobile device. The instructions, when executed, cause the mobile device to perform the operations of FIG. 2.

The first access network 104 and the second access network 106 in FIG. 1 are intentionally depicted very generally, as different access networks have different components, and how each access network is configured is implementation specific. In general, each access network will include at least one access point, such as an evolved Node B, a Node B, or a base station, with which the mobile device 102 communicates. This serving access point interfaces with the internal nodes of the access network, that are used for setting up, establishing, and releasing the communication sessions on the network side, and that assist in moving the ongoing call from one communication session to another on the network side. Although not illustrated, each access network interfaces with a core network, or the like, that ultimately links the access network to the remote party with which the mobile device 102 is communicating.

As one example, the first access network 104 may be a Long Term Evolution (LTE) network, which is part of the Evolved Packet System (EPS), and the second access network 106 may be an access network that does not support PS voice bearers (e.g. a legacy network such as a Universal Terrestrial Radio Access Network or a GSM EDGE Radio Access Network), or vice versa.

The method of FIG. 2 may, of course, comprise additional steps. For example, the method may include one or both of the following additional steps:

(1) If coverage is lost such that the mobile device is unable to communicate with the first access network while waiting the predetermined amount of time, then the mobile device releases its resources pertaining to the first communication.
(2) If a handover cancel command is received at the mobile device while waiting the predetermined amount of time, then the mobile device releases its resources pertaining to the first communication session.

Also, the method of FIG. 2 may be repeated, such that it is performed anew each time a message is received at the mobile device that indicates that the mobile device is to release resources pertaining to a communication session for a voice call over an access network.

The description above, along with FIGS. 1 and 2, is meant to illustrate example embodiments. For completeness, and to show the methods disclosed herein as applied to one example implementation, a specific implementation will now be described. The example implementation below assumes moving from a PS session to a CS session. Specifically, the example implementation below assumes that a call is anchored in the IP Multimedia Subsystem (IMS), and the call is ongoing in a PS session in the PS domain over an Evolved Packet System (EPS). Then, during the call, the voice bearer is moved from the PS session in the PS domain to a CS session in the CS domain. The mobile device is handed over to a legacy network for CS access. The legacy network may be, for example, UTRAN or GERAN. This PS to CS fallback is performed in a manner consistent with the Single Radio Voice Call Continuity (SRVCC) protocol specified in the 3GPP document ETSI TS 23.216 v.11.8.0 "Digital cellular telecommunications system (Phase 2+); Universal Mobile Telecommunications System (UMTS);

LTE; Single Radio Voice Call Continuity (SRVCC); Stage 2", released in April 2013, publically available, and incorporated herein by reference.

Figure 3:
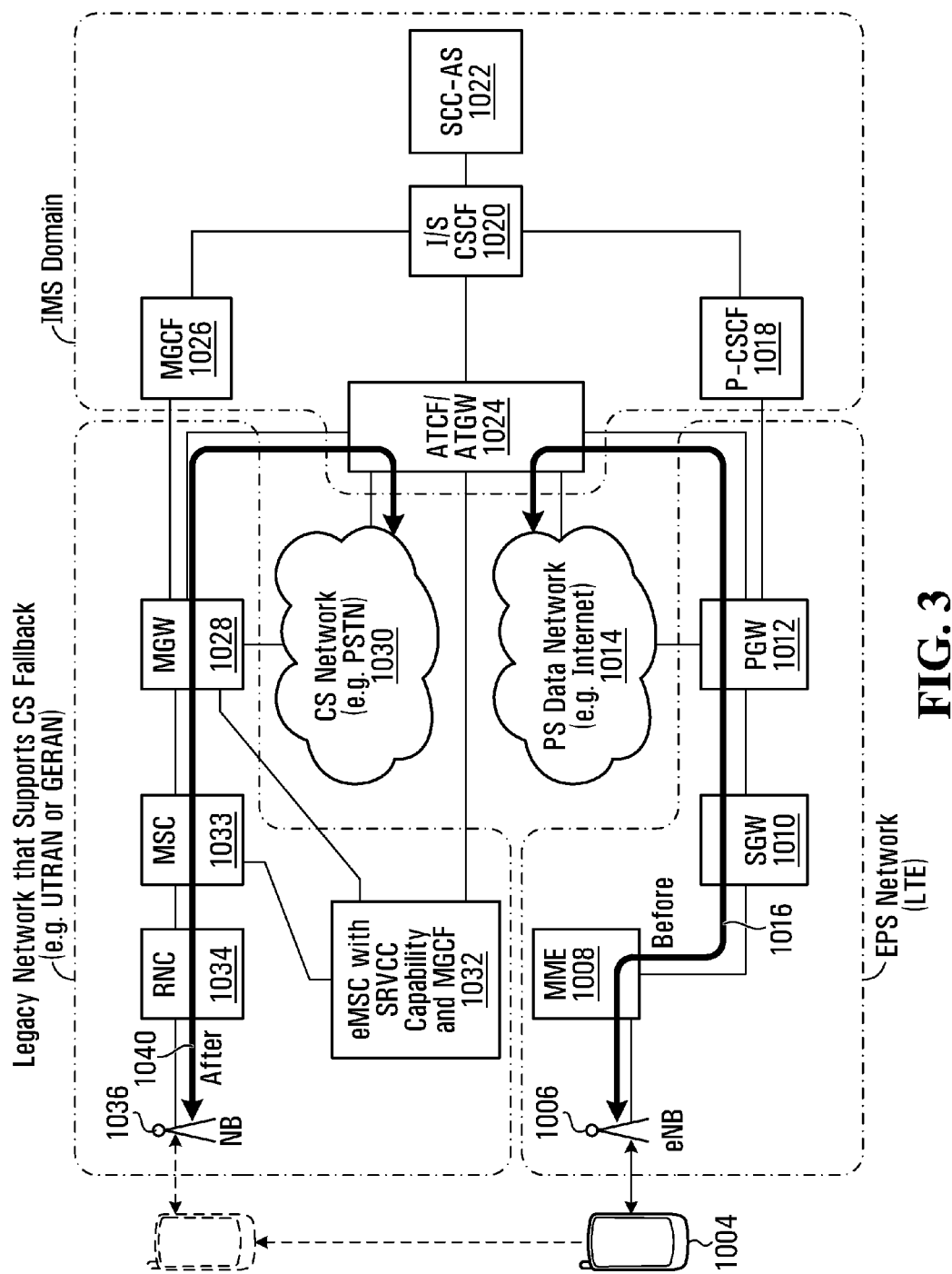
FIG. 3 is a block diagram illustrating a mobile device handing over from an EPS network to a legacy network and continuing a call on the legacy network.

FIG. 3 illustrates a network architecture that includes the EPS, the IMS domain, and the legacy network. The thick black arrow 1016 shows the flow of data (the voice bearer) when the call is initially ongoing in the PS session in the PS domain, and the thick black arrow 1040 shows the data flow once the call has been moved to the CS session in the CS domain.

As illustrated in FIG. 3, a mobile device 1004 is initially attached to the EPS via an evolved Node B (eNB) 1006, and the call is initially ongoing in the PS domain. Connected to the eNB 1006 is a Mobility Management Entity (MME) 1008, which is the control node that processes the signaling between the eNB 1006 and the core of the EPS. A Serving Gateway (SGW) 1010 is connected to the MME 1008 and acts as the local mobility anchor for the data bearers. The SGW 1010 connects to the Packet Gateway (PGW) 1012. The PGW 1012 interfaces to an external PS data network 1014 (such as the Internet), but also to an Access Transfer Control Function (ATCF) and Access Transfer Gateway (ATGW) 1024 in the IMS domain.

A Proxy Call Service Control Function (P-CSCF) 1018 is connected to the PGW 1012 and is the entry point to the IMS domain for control signals. The P-CSCF connects to a serving or interrogating CSCF 1020, which perform signalling functions in the IMS domain. Connected to the CSCF 1020 is the Service Centralization and Continuity Application Server (SCC-AS) 1022, which is part of the IMS domain and initiates service continuity operations.

The ATCF/ATGW 1024 mentioned above interfaces with both the external PS data network 1014 and an external CS network 1030, such as the Public Switched Telephone Network (PSTN). The ATCF/ATGW 1024 anchors the call in the IMS domain in that the voice bearer path flows through the ATGW to either the external PS data network 1014 or the external CS network 1030, depending on whether the call is in the PS domain or the CS domain. The ATCF controls the ATGW. The ATCF/ATGW 1024 are used in a known manner for redirecting the data flow from the PS domain to the CS domain during PS to CS fallback.

Also included in the IMS domain is the Media Gateway Control Function (MGCF) 1026, which controls the resources in a Media Gateway (MGW) 1028 of the legacy network. The MGW 1028 also interfaces with the external CS network 1030.

Included as part of the legacy network is the Enhanced Mobile Switching Center (eMSC) server 1032, which is enhanced with SRVCC capability and which includes or is connected to a MGCF to handle control messages for setting up the CS voice bearer in the IMS network (in this regard, the MGCF is illustrated as part of the eMSC for ease of illustration only—they may be discrete/separate components). The eMSC server 1032 also connects to a MSC 1033, which is connected to a Radio Network Controller (RNC) 1034, which controls a Node B (NB) 1036. Although the MSC 1033 and eMSC server 1032 are shown as separate entities, it could be the case that the eMSC 1032 is implemented as a software upgrade on the MSC 1033.

The diagram in FIG. 3 only illustrates some of the relevant network nodes and components. It will be appreciated that others are known and may be present.

Figure 4:
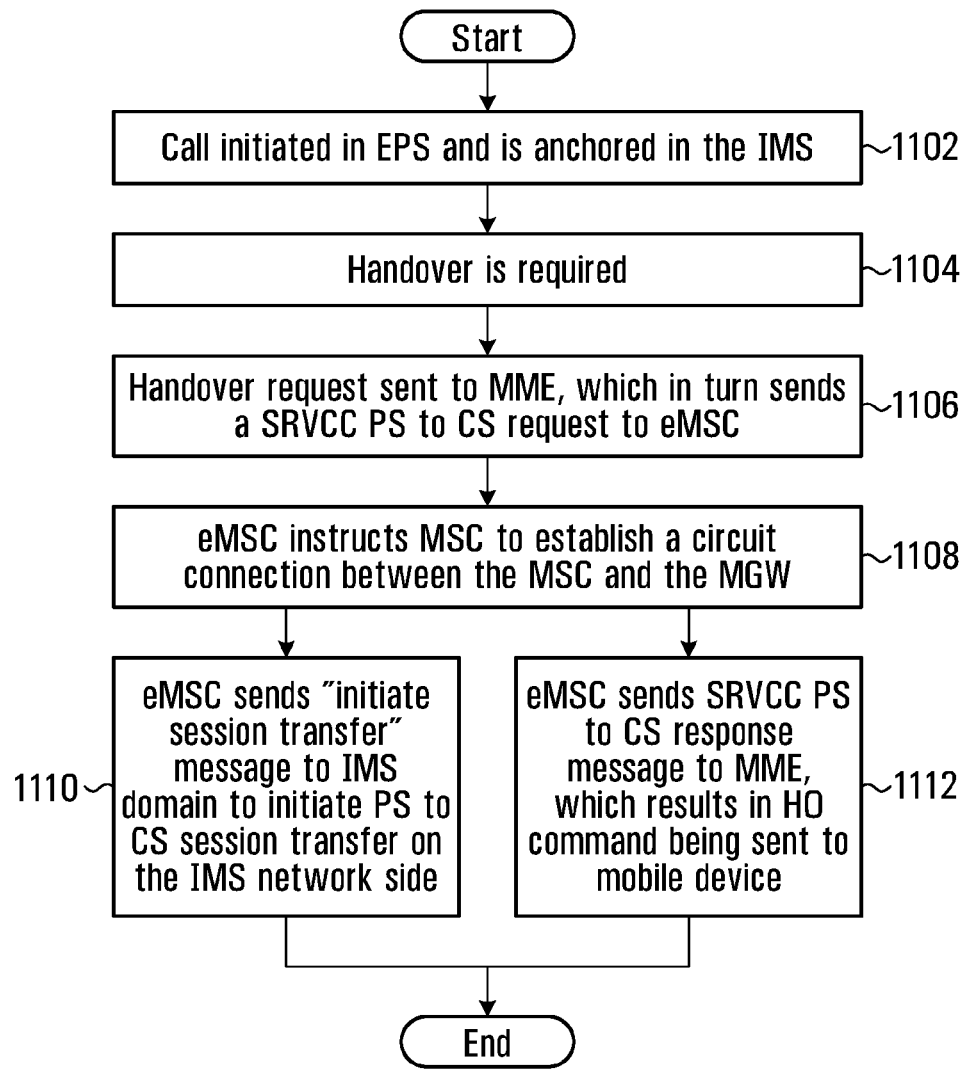
FIG. 4 is a flow diagram illustrating initiation of the handover of FIG. 3.
Figure 5:
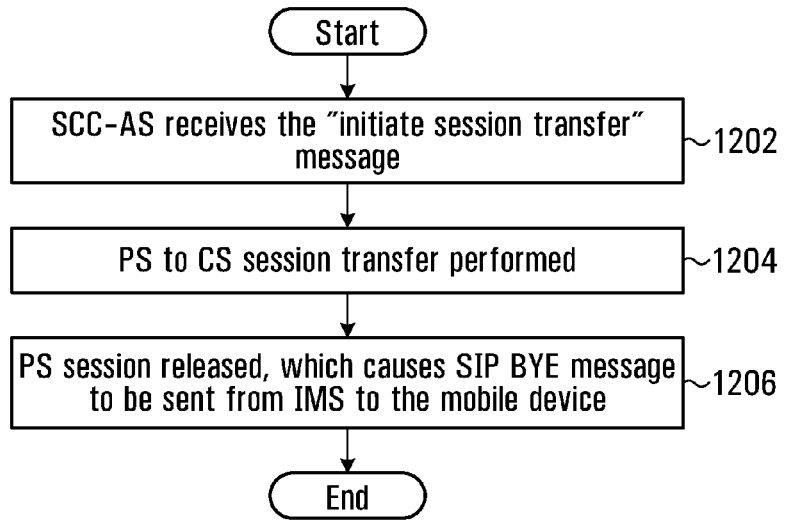
FIG. 5 is a flow diagram illustrating operations performed in the IMS domain as part of the handover.
Figure 6:
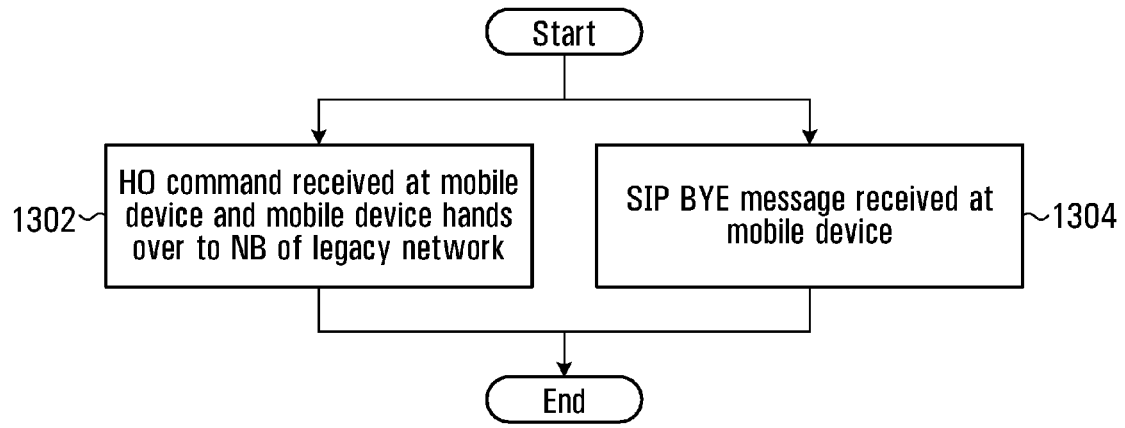
FIG. 6 is a flow diagram illustrating operations performed on the mobile device side as part of the handover.

FIGS. 4 to 6 illustrate flow diagrams outlining steps performed when moving an ongoing call from a PS session in the PS domain to a CS session in the CS domain in a network architecture such as that illustrated in FIG. 3. In the methods illustrated in FIGS. 4 to 6, some specific steps have been omitted for the sake of clarity, and as such the flow diagrams of these figures can be considered a summary of relevant steps. Such steps and related operations are specified in detail in the 3GPP document ETSI TS 23.216 v.11.8.0 mentioned above.

Turning to FIG. 4, in step 1102, a call is initiated in the EPS (and therefore in the PS domain) and is anchored in the IMS. An example of such call origination may be found in Section 6.2.1 of the 3GPP document TS 23.237 V11.7.0 "Technical Specification Group Services and System Aspects; IP Multimedia Subsystem (IMS) Service Continuity; Stage 2 (Release 11)", released in March 2013, publically available, and incorporated herein by reference.

In step 1104, the eNB 1006 decides that a handover is required. This decision is based on measurements from the mobile device 1004 relating to signal strength. For example, the mobile device 1004 may be moving out of the range of the eNB 1006 (but into or still in) the range of the neighbouring NB 1036. The eNB 1006 recognizes the weakening signal strength at the eNB 1006 and determines that a handover to another node is required.

In step 1106, the eNB 1006 sends a handover request to the MME 1008, and the MME 1008 in turn sends an SRVCC PS to CS request to the eMSC server 1032.

In step 1108, the eMSC server 1032 instructs the MSC 1033 in the legacy network to establish a circuit connection between the MSC 1033 and the MGW 1028.

In step 1110, the eMSC server 1032 initiates PS to CS session transfer on the IMS network side by sending an "initiate session transfer" message (such as an ISUP IAM message) towards the IMS domain. The "initiate session transfer" message is routed through the ATCF/ATGW 1024 and I/S CSCF 1020 to the SCC-AS 1022.

In step 1112, the eMSC server 1032 also sends a SRVCC PS to CS response message to the MME 1008, which results in a handover (HO) command being sent to the mobile device 1004 by the eNB 1006.

According to the 3GPP document ETSI TS 23.216 v.11.8.0 mentioned above, steps 1110 and 1112 happen independently from each other. To this end, steps 1110 and 1112 are illustrated in parallel in FIG. 4.

With reference now to FIG. 5, the steps initiated in the IMS domain are outlined.

In step 1202, the SCC-AS 1022 receives the "initiate session transfer" message, as per step 1110 of FIG. 4.

In step 1204, the SCC-AS 1022 performs session transfer and a remote leg update by switching the access leg communicating with the remote leg from the source access leg (i.e. the PS access) to the target access leg (i.e. the CS access). As part of this procedure, the ATCF/ATGW 1024 switches the bearer path from the PS data network 1014 to the CS network 1030.

In step 1206, the SCC-AS 1002 releases the source access leg (i.e. the PS connection) by initiating a session release, which releases the PS session. Once the PS session is released, a "hangup" or "SIP BYE" message is sent from the IMS to the mobile device 1004. This message is received at the mobile device 1006 and it instructs to the mobile device 1006 to release its resources pertaining to the PS session.

Steps 1204 and 1206 are known and are specified in more detail in the 3GPP document ETSI TS 23.216 v.11.8.0 mentioned above, along with reference to:

(1) the 3GPP document TS 23.237 V11.7.0 "Technical Specification Group Services and System Aspects; IP Multimedia Subsystem (IMS) Service Continuity; Stage 2 (Release 11)", released in March 2013, publically available, and incorporated herein by reference (see Sections 6.3.1.5, 6.3.1.6, 6.3.2.1.4, and 6.3.2.1.9 in particular), (2) the 3GPP document TS 23.228 V11.7.0 "Technical Specification Group Services and System Aspects; IP Multimedia Subsystem (IMS); Stage 2 (Release 11)", released in December 2012, publically available, and incorporated herein by reference (see Section 5.10.3.1.1 in particular), and (3) the 3GPP document TS 24.237 V11.6.0 "Technical Specification Group Core Network and Terminals; IP Multimedia (IM) Core Network (CN) subsystem IP Multimedia Subsystem (IMS) Service Continuity; Stage 3 (Release 11)", released in March 2013, publically available, and incorporated herein by reference (see Section A.6.2 in particular).

With reference now to FIG. 6, the following occurs from the perspective of the mobile device 1004.

In step 1302, the handover (HO) command is received at the mobile device 1004, which is that sent in step 1112 of FIG. 4. In response, the mobile device 1004 hands over to the NB 1036 to continue the call over the CS connection that has been set up.

In step 1304, the SIP BYE message mentioned in step 1206 of FIG. 5 is received at the mobile device 1004, which instructs to the mobile device 1006 to release its resources pertaining to the PS session.

Ideally, step 1302 occurs before step 1304. That is, the handover command is received first, and in response the mobile device 1004 hands over to the legacy access network to continue the call in a CS session. As part of the handover process, the mobile device 1004 releases its resources relating to the PS session, as it is now communicating over the CS session. If (and when) the SIP BYE message is subsequently received in step 1304, the SIP BYE message is effectively ignored, since the relevant processes relating to the SIP BYE message (such as releasing the PS session) have been completed, and since the other processes relating to the SIP BYE message (such as informing the higher layers and the user that the call has been terminated), are not applicable because the call has not ended, but has been handed over to the CS domain.

However, due to network delays it may be the case that the SIP BYE message is received before the handover command. In particular, and as mentioned earlier, step 1110 of FIG. 4 (which ultimately results in the mobile device 1004 receiving the SIP BYE message) happens independently from step 1112 of FIG. 4 (which ultimately results in a handover command being sent to the mobile device 1004). The 3GPP document ETSI TS 23.216 v.11.8.0 mentioned above even states that steps 1110 and 1112 happen independently from each other. Therefore, it could be the case that in a particular implementation the SIP BYE is sometimes received at the mobile device 1004 before the handover command is received, depending on delay in the network. In such a situation, the mobile device 1004 would not know whether it is being handed over to a CS session in the CS domain, or whether the SIP BYE is being received for another reason (e.g. because the other party hung up and ended the call). In any case, acting on the SIP BYE command would cause the mobile device 1004 to release its resources pertaining to the PS session, which in the case of SIP BYE causes the mobile device to ultimately terminate the call at the mobile device side and inform the user of the call termination. In particular, the mobile device 1004 would release its codec for the PS voice bearer, release the data resources it was using for the PS session, and release the resources it was using to maintain call control for the PS session. The user would be informed that the call has been terminated. If it happened to be the case that the intent was for the call to be handed over to a CS session in the CS domain, but that the handover had not occurred yet because the handover command was delayed reaching the mobile device 1004, then the call would be dropped without handing over. Even if the handover command arrived shortly after the SIP BYE, it would typically be too late and the handover command would be ignored by the mobile device. This is because once the SIP BYE starts to be processed, the mobile device is typically not configured to try and reverse the SIP BYE and process the handover instead.

To help address this potential drawback, the mobile device 1004 includes a call continuity timer, which is started when a SIP BYE message is received. That is, rather than the mobile device 1004 immediately acting on the SIP BYE message, the mobile device 1004 instead delays processing the SIP BYE to provide a window of opportunity for a delayed handover command to be received. The duration of the window is defined by the duration of the timer (that is, the time between when the timer starts and when it expires).

Figure 7:
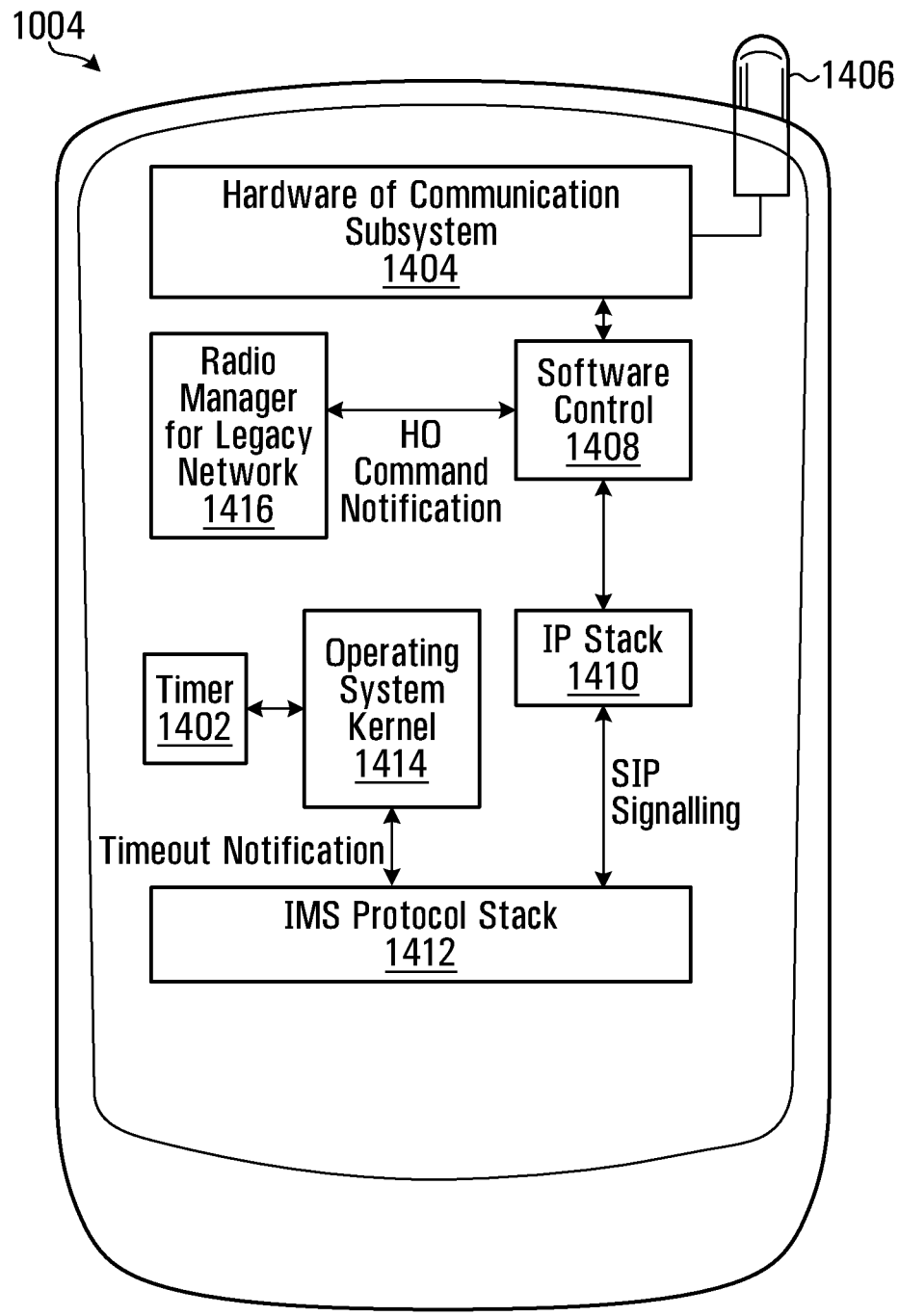
FIG. 7 is a block diagram of the mobile device in FIG. 3.

FIG. 7 illustrates the mobile device 1004 in more detail, showing the call continuity timer as timer 1402, which is a counter in memory. The mobile device 1004 also includes communication subsystem hardware 1404 (e.g. the physical transmitter/receiver), connected to an antenna 1406. The communication subsystem hardware 1404 is controlled by and interfaces with a software control module 1408 (e.g. for performing the signal processing and for connecting to the other higher layer modules). The software control module 1408 interfaces with the IP stack 1410, which processes IP packets and passes SIP messages to the IMS Protocol stack 1412. The IMS Protocol stack 1412 processes the SIP messages. The IMS Protocol stack 1412 also communicates with the operating system 1414, which ultimately controls incrementing the continuity timer 1402 and which lets the IMS Protocol stack 1412 know when the timer 1402 has expired ("timeout notification"). A radio manager 1416 for the legacy network processes the handover command ("HO command notification"), when received, and controls handover to and communication with the legacy network. The modules and software illustrated in FIG. 7 consist of code stored in physical memory, such as a computer readable or processor readable memory. The code is executed by one or more processors to cause the one or more processors to perform the operations specified by the software.

Figure 8:
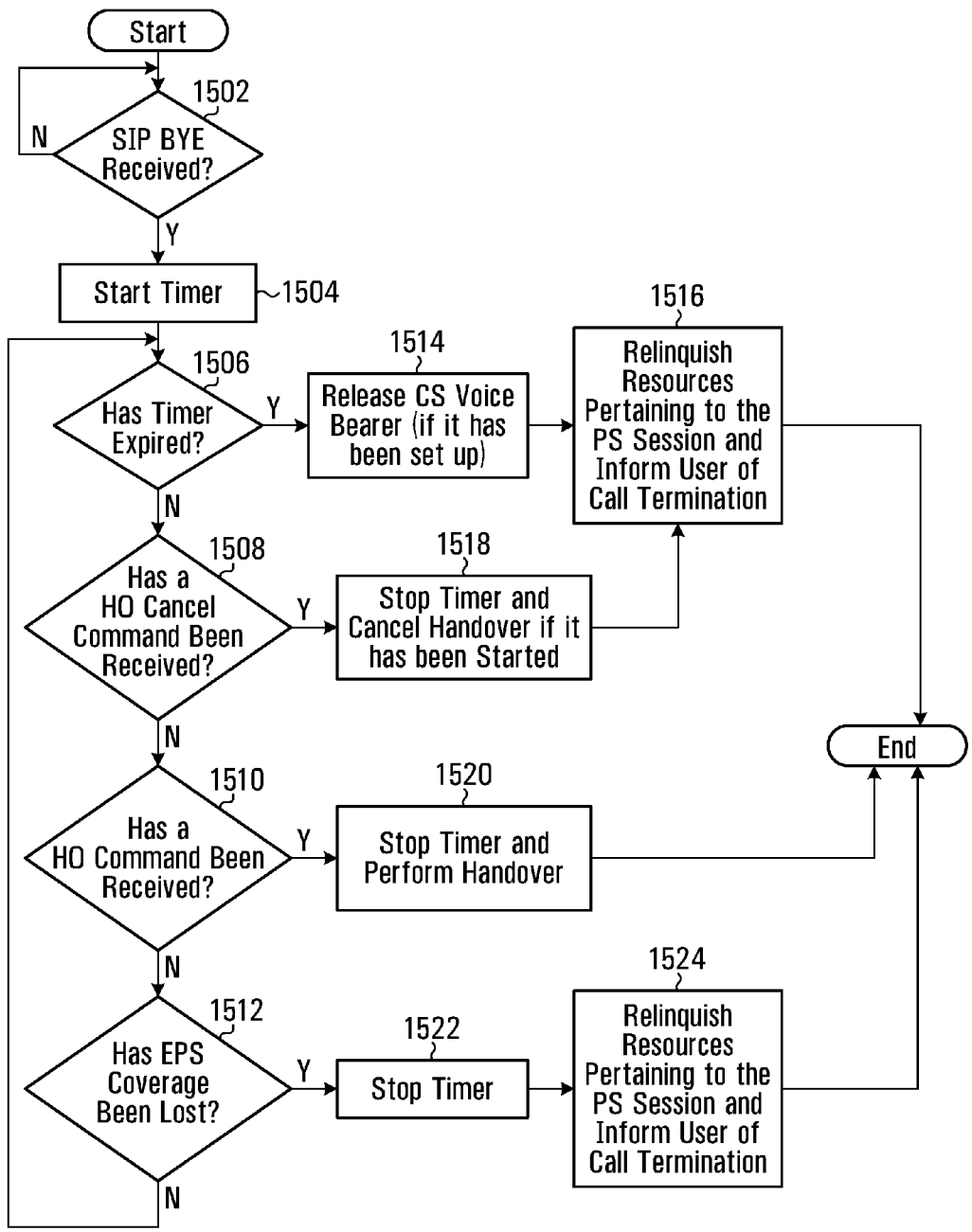
FIG. 8 is a flow diagram illustrating a method performed by the mobile device of FIG. 3.

Turning now to FIG. 8, the operation of the mobile device 1004 and the call continuity timer 1402 is illustrated. The steps of FIG. 8 are summarized below:

Step 1502: A SIP BYE message is received at the mobile device 1004; proceed to step 1504.

Step 1504: The mobile device 1004 starts its call continuity timer 1402; proceed to step 1506.

Step 1506: Has the timer 1402 expired? If no, then proceed to step 1508. If yes, then proceed to step 1514.

Step 1508: Has a handover (HO) cancel command been received? If no, then proceed to step 1510. If yes, then proceed to step 1518.

Step 1510: Has a handover (HO) command been received? If no, then proceed to step 1512. If yes, then proceed to step 1520.

Step 1512: Has EPS coverage been lost (e.g. mobile device 1004 has now moved too far out of the range of the eNB 1006)? If no, then proceed to step 1506. If yes, then proceed to step 1522.

Step 1514: Release the CS voice bearer (if it has been set up), then proceed to step 1516.

Step 1516: Release resources pertaining to the PS session and inform user that call has been terminated. End flow.
Step 1518: Stop timer 1402 and cancel handover, if it has been started, and then proceed to step 1516.
Step 1520: Stop timer 1402 and perform handover, as per the received handover command. End flow.
Step 1522: Stop timer 1402 and proceed to step 1524.
Step 1524: Release resources pertaining to the PS session and inform user that call has been terminated. End flow.

In the steps above, when it is stated that the mobile device 1004 performs a step (e.g. "the mobile device 1004 starts its call continuity timer"), it will be appreciated that one of the particular modules described in relation to FIG. 7 will be utilized to perform the operation. That is, the appropriate code stored in the memory of the mobile device 1004 will be executed by one or more processors of the mobile device 1004 to cause the mobile device 1004 to perform the operation. Such details are implementation specific and have been omitted for the sake of clarity.

Without the method of FIG. 8, and upon receiving a SIP BYE message, the mobile device 1004 would simply release its resources pertaining to the PS session and the user would be informed that the call had been terminated. This is fine if the call is genuinely being terminated (e.g. the other party has hung up), but is not ideal in a PS to CS fallback situation, such as that described above, in which the SIP BYE message is received before the handover command. By performing the method of FIG. 8, upon receipt of a SIP BYE message the mobile device 1004 delays releasing its resources pertaining to the PS session, for a duration of time up to the expiry of the timer 1402, so as to allow a delayed handover command to be received.

The duration the timer 1402 is allowed to run before it expires is implementation specific, but is typically on the order of milliseconds. As one example, the timer 1402 may be set to expire after 2000 ms. As will be appreciated, a timer that is configured to expire too quickly will reduce the effectiveness of the method of FIG. 8, as there will not be a long enough window available for receiving the delayed handover command. On the other hand, a timer that is configured to run too long before it expires will cause undue delay in situations where handover is not even occurring (e.g. the person at the other end simply hung up, resulting in the receipt of a SIP BYE message), or in situations in which there has been an error such that the handover command is never received during the handover, or such that the handover command is unduly delayed in reaching the mobile device 1004. While the timer is running there would typically be no voice bearer (or at least it would be in limbo), and the user would typically experience silence. It is undesirable to maintain such a situation for too long.

The specific example method of FIG. 8 also includes the additional tasks of the mobile device 1004 checking if a handover cancel command has been received (step 1508) and the mobile device 1004 checking whether EPS coverage has been lost (step 1512). A handover cancel command would be received (in step 1508) if the network cancelled the handover. In such a situation, the mobile device 1004 would stop the timer (as per step 1518) and continues processing the SIP BYE command (i.e. release the resources related to the PS session and ultimately inform the user of the call termination). If EPS coverage is lost (as in step 1512), this means that the handover command will not be received, since it is transmitted over the EPS access network, and therefore the call will be dropped. The mobile device 1004 therefore stops the timer (step 1522) and continues processing the SIP BYE command (i.e. release the resources related to the PS session and ultimately inform the user of the call termination, as per step 1524).

Upon the completion of the method of FIG. 8, the call continuity timer is reset, and the method is performed again so that the mobile device 1004 can act in the manner shown in FIG. 8 upon receipt of another SIP BYE command.

Figure 9:
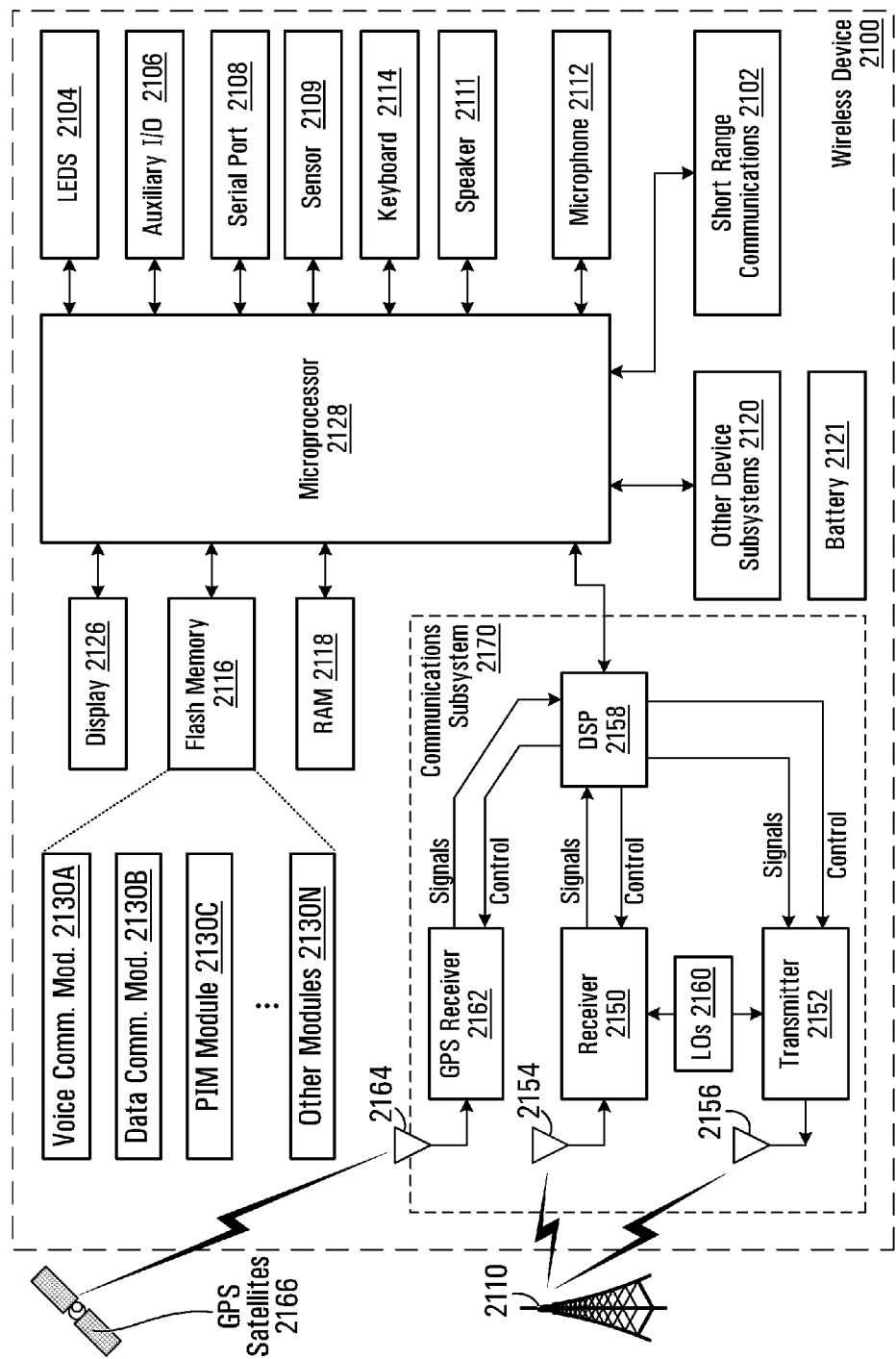
FIG. 9 is a block diagram of another example of a mobile device.

Referring now to FIG. 9, a block diagram is shown of a specific example of another mobile device 2100 that may implement any of the methods described herein. The mobile device 2100 is shown with specific components for implementing different features including (for example), the methods described herein. It is to be understood that the mobile device 2100 is shown with very specific details for exemplary purposes only.

The mobile device 2100 has a housing that may be elongated vertically, or may take on other sizes and shapes (including clamshell housing structures). The keyboard 2114 may include a mode selection key, or other hardware or software for switching between text entry and telephony entry. Alternatively, the mobile device 2100 may have a housing that does not take on other sizes and shapes.

A microprocessor 2128 is shown schematically as coupled between a keyboard 2114 and a display 2126. The microprocessor 2128 controls operation of the display 2126, as well as overall operation of the mobile device 2100, in response to actuation of keys on the keyboard 2114 by a user.

In addition to the microprocessor 2128, other parts of the mobile device 2100 are shown schematically. These include: a communications subsystem 2170; a short-range communications subsystem 2102; the keyboard 2114 and the display 2126, along with other input/output devices including a set of LEDs 2104, a set of auxiliary I/O devices 2106, a serial port 2108, a speaker 2111 and a microphone 2112; as well as memory devices including a flash memory 2116 and a Random Access Memory (RAM) 2118; and various other device subsystems 2120. The keyboard 2114, speaker 2111, microphone 2112, display 2126, and LEDs 2104 are part of the user-interface.

The mobile device 2100 may have a battery 2121 to power the active elements of the mobile device 2100.

The mobile device 2100 is in some embodiments a two-way radio frequency (RF) communication device having voice and data communication capabilities. In addition, the mobile device 2100 in some embodiments has the capability to communicate with other computer systems via the Internet. The two-way RF communication is for communicating with a network.

Operating system software executed by the microprocessor 2128 is in some embodiments stored in a persistent store, such as the flash memory 2116, but may be stored in other types of memory devices, such as a read only memory (ROM) or similar storage element. In addition, system software, specific device applications, or parts thereof, may be temporarily loaded into a volatile store, such as the RAM 2118. Communication signals received by the mobile device 2100 may also be stored to the RAM 2118.

The microprocessor 2128, in addition to its operating system functions, enables execution of software applications on the mobile device 2100. A predetermined set of software applications that control basic device operations, such as a voice communications module 2130A and a data communications module 2130B, may be installed on the mobile device 2100 during manufacture. In addition, a personal information manager (PIM) application module 2130C may also be installed on the mobile device 2100 during manufacture. The PIM application is in some embodiments capable of organizing and managing data items, such as e-mail, calendar events, voice mails, appointments, and task items. The PIM application is also in some embodiments capable of sending and receiving data items via a wireless network 2110. In some embodiments, the data items managed by the PIM application are seamlessly integrated, synchronized and updated via the wireless network 2110 with the device user's corresponding data items stored or associated with a host computer system.

Additional software modules, illustrated as another software module 2130N, may be installed during manufacture.

Communication functions, including data and voice communications, are performed through the communication subsystem 2170, and possibly through the short-range communications subsystem 2102. The communication subsystem 2170 includes a receiver 2150, a transmitter 2152, a GPS receiver 2162, and one or more antennas, illustrated as a receive antenna 2154, a transmit antenna 2156, and a GPS antenna 2164. In addition, the communication subsystem 2170 also includes a processing module, such as a digital signal processor (DSP) 2158, and local oscillators (LOs) 2160. The communications subsystem 2170 is used to communicate with a network.

The specific design and implementation of the communication subsystem 2170 is dependent upon the communication network in which the mobile device 2100 is intended to operate. For example, the communication subsystem 2170 of the mobile device 2100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 2170 may also be designed to operate with an 802.11 Wi-Fi network, and/or an 802.16 WiMAX network. Other types of data and voice networks, both separate and integrated, may also be utilized with the mobile device 2100. The communication subsystem 2170 may operate with the EPS network or Legacy network (or both) described earlier in relation to FIG. 3.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a UICC, in order to operate on a GPRS network.

When network registration or activation procedures have been completed, the mobile device 2100 may send and receive communication signals over the communication network 2110 (via NB 1036 or eNB 1006 shown in FIG. 3, as one example). Signals received from the communication network 2110 by the receive antenna 2154 are routed to the receiver 2150, which provides for signal amplification, frequency down conversion, filtering, channel selection, etc., and may also provide analog to digital conversion. Analog-to-digital conversion of the received signal allows the DSP 2158 to perform more complex communication functions, such as constellation demapping and decoding. In a similar manner, signals to be transmitted to the network 2110 are processed (e.g., modulated and encoded) by the DSP 2158 and are then provided to the transmitter 2152 for digital to analog conversion, frequency up conversion, filtering, amplification and transmission to the communication network 2110 (or networks) via the transmit antenna 2156.

In addition to processing communication signals, the DSP 2158 provides for control of the receiver 2150, the transmitter 2152, and the GPS receiver 2162. For example, gains applied to communication signals in the receiver 2150 and the transmitter 2152 may be adaptively controlled through automatic gain control algorithms implemented in the DSP 2158.

In a data communication mode, a received signal, such as a text message or downloaded web page, is processed by the communication subsystem 2170 and is input to the microprocessor 2128. The received signal is then further processed by the microprocessor 2128 for an output to the display 2126, or alternatively to some other auxiliary I/O devices 2106. A device user may also compose data items, such as e-mail messages, using the keyboard 2114 and/or some other auxiliary I/O device 2106, such as a touchpad, a rocker switch, a thumb-wheel, or some other type of input device. The composed data items may then be transmitted over the communication network 2110 via the communication subsystem 2170.

In a voice communication mode, overall operation of the device is substantially similar to the data communication mode, except that received signals are output to a speaker 2111, and signals for transmission are generated by a microphone 2112. Alternative voice or audio I/O subsystems, such as a voice message recording subsystem, may also be implemented on the mobile device 2100. In addition, the display 2126 may also be utilized in voice communication mode, for example, to display the identity of a calling party, the duration of a voice call, or other voice call related information.

Location determination using GPS technology involves receiving GPS signals from GPS satellites 2166 on the antenna 2164. The GPS signals are received using the GPS receiver 2162 and processed by the DSP 2158. Typically, GPS signals from at least four satellites are processed. Further details of GPS are known in the art and are omitted for simplicity.

The short-range communications subsystem 2102 enables communication between the mobile device 2100 and other proximate systems or devices, which need not necessarily be similar devices. For example, the short range communications subsystem may include an infrared device and associated circuits and components, or a Bluetooth™ communication module to provide for communication with similarly-enabled systems and devices.

Although the foregoing has been described with reference to certain specific embodiments, various modifications thereof will be apparent to those skilled in the art without departing from the scope of the claims appended hereto.

The invention claimed is:

1. A method comprising:
during a first communication session for a voice call over a first access network, receiving a message at a mobile device, the message indicating that the mobile device is to release resources pertaining to the first communication session for the voice call over the first access network;
when no handover command, different from the message at the mobile device, has been received by the mobile device before receipt of the message, then the mobile device refraining from releasing the resources pertaining to the first communication session despite receipt of the message, and the mobile device instead waiting during the refraining for arrival of a handover command, different from the message, for a predetermined amount of time after receipt of the message before releasing resources pertaining to the first communication session;

if the handover command is not received during said refraining, then the mobile device releasing the resources pertaining to the first communication session without handing over to a second access network upon expiry of the predetermined amount of time and indicating that the voice call has been terminated.

2. The method of claim 1, further comprising:

if the handover command is received during said refraining, then the mobile device handing over to the second access network and continuing the voice call using a second communication session.

3. The method of claim 2, wherein said handing over to the second access network further comprises releasing the resources pertaining to the first communication session.

4. The method of claim 2, wherein the first communication session is a packet switched (PS) session, and the second communication session is a circuit switched (CS) session.

5. The method of claim 1, wherein said refraining for the predetermined amount of time comprises starting a timer upon receipt of the message to release resources pertaining to a first communication session and waiting up to expiry of the timer.

6. The method of claim 1, wherein the method is performed along with or as part of a Single Radio Voice Call Continuity (SRVCC) protocol.

7. The method of claim 1, wherein releasing the resources pertaining to the first communication session comprises: the mobile device releasing a codec for a voice bearer, the mobile device releasing data resources used for the first communication session, and the mobile device releasing resources used to maintain call control for the first communication session.

8. A mobile device comprising:
one or more communication subsystems for communicating with a plurality of access networks;
a processor in communication with the one or more communication subsystems, the processor configured to:
receive a message during a first communication session for a voice call over a first access network, the message indicating that the mobile device is to release resources pertaining to the first communication session for the voice call over the first access network;
wherein upon receipt of the message, the processor performs operations comprising:
when no handover command, different from the message at the mobile device, has been received by the mobile device before receipt of the message, then refraining from releasing the resources pertaining to the first communication session despite receipt of the message, and the instead wait during the refraining for arrival of a handover command, different from the message, for a predetermined amount of time after receipt of the message before releasing resources pertaining to the first communication session;
if the handover command is not received during said refraining, then releasing the resources pertaining to the first communication session without handing over to a second access network upon expiry of the predetermined amount of time and indicating at a user interface that the voice call has been terminated.

9. The mobile device of claim 8, wherein the processor is further configured to perform operations further comprising:
if the handover command is received during said refraining, then handing over to the second access network and continue the voice call using a second communication session.

10. The mobile device of claim 9, wherein said handing over to the second access network further comprises releasing the resources pertaining to the first communication session.

11. The mobile device of claim 9, wherein the first communication session is a packet switched (PS) session, and the second communication session is a circuit switched (CS) session.

12. The mobile device of claim 8, wherein the mobile device further comprises a timer, and wherein said refraining for the predetermined amount of time comprises starting the timer upon receipt of the message to release resources pertaining to a first communication session and waiting up to expiry of the timer.

13. The mobile device of claim 8, wherein releasing the resources pertaining to the first communication session comprises: releasing a codec for a voice bearer, releasing data resources used for the first communication session, and releasing resources used to maintain call control for the first communication session.

14. A non-transitory computer readable storage medium having stored thereon computer executable instructions that, when executed by a processor of a mobile device, cause the mobile device to perform operations comprising:
during a first communication session for a voice call over a first access network, receiving a message at a mobile device, the message indicating that the mobile device is to release resources pertaining to the first communication session for the voice call over the first access network;
when no handover command, different from the message at the mobile device, has been received by the mobile device before receipt of the message, then the mobile device refraining from releasing the resources pertaining to the first communication session despite receipt of the message, and the mobile device instead waiting during the refraining for arrival of a handover command, different from the message, for a predetermined amount of time after receipt of the message before releasing resources pertaining to the first communication session;
if the handover command is not received during said refraining, then the mobile device releasing the resources pertaining to the first communication session without handing over to a second access network upon expiry of the predetermined amount of time and indicating that the voice call has been terminated.

15. The non-transitory computer readable storage medium of claim 14, wherein the instructions, when executed, further cause the processor of the mobile device to perform operations comprising:
if the handover command is received during said refraining, then the mobile device handing over to the second access network and continuing the voice call using a second communication session.

16. The non-transitory computer readable storage medium of claim 15, wherein said handing over to the second access network further comprises releasing the resources pertaining to the first communication session.

17. The non-transitory computer readable storage medium of claim 15, wherein the first communication session is a packet switched (PS) session, and the second communication session is a circuit switched (CS) session.

\* \* \* \* \*